United States Patent [19]

Hoppe-Höffler et al.

[11] Patent Number: 5,378,335
[45] Date of Patent: Jan. 3, 1995

[54] PROCESS FOR COATING ELECTRICALLY CONDUCTIVE SUBSTRATES, AND AN AQUEOUS, CATHODICALLY DEPOSITABLE ELECTRODEPOSITION PAINT

[75] Inventors: Monika Hoppe-Höffler, W-Bloomfield, Mich.; Udo Strauss; Bernd-Rüdiger Volkmann, both of Münster, Germany

[73] Assignee: BASF Lacke+Farben Aktiengesellschaft, Munster, Germany

[21] Appl. No.: 216,790

[22] Filed: Mar. 23, 1994

Related U.S. Application Data

[63] Continuation of Ser. No. 859,309, Jul. 7, 1992, abandoned.

[30] Foreign Application Priority Data

Nov. 24, 1989 [DE] Germany ............................ 3938883

[51] Int. Cl.6 ............................................ C25D 13/10
[52] U.S. Cl. ................. 204/181.7; 204/181.4; 524/403; 524/901
[58] Field of Search ................. 204/181.7, 181.4; 524/403, 901

[56] References Cited

U.S. PATENT DOCUMENTS 4,988,420  1/1991  Batzill et al. .................. 204/181.1

*Primary Examiner*—John Niebling
*Assistant Examiner*—Kishor Mayekar
*Attorney, Agent, or Firm*—Anne Gerry Sabourin

[57] ABSTRACT

The invention relates to a process for coating electrically conductive substrates, in which aqueous electrodeposition paints containing 1 to 15 percent by weight of electrically conductive carbon black and/or graphite having a primary particle diameter of less than 10 μm in combination with up to 12 percent by weight of zinc powder or zinc flakes, with the percentages by weight relating to the total amount of binder and—if present—crosslinking agent contained in the electrodeposition paint, are employed.

6 Claims, No Drawings

PROCESS FOR COATING ELECTRICALLY CONDUCTIVE SUBSTRATES, AND AN AQUEOUS, CATHODICALLY DEPOSITABLE ELECTRODEPOSITION PAINT

This is a continuation of copending application Ser. No. 07/859,309, filed on Jul. 7, 1992, now abandoned.

BACKGROUND OF THE INVENTION

1. Field of the Invention

The invention relates to a process for coating electrically conductive substrates, in which
  (1) the electrically conductive substrate is immersed in an aqueous electrodeposition paint
  (2) the substrate is connected as the cathode
  (3) a film is deposited on the substrate by direct current
  (4) the coated substrate is removed from the electrodeposition paint and
  (5) the deposited paint film is baked.

The invention also relates to an aqueous, cathodically depositable electrodeposition paint.

2. Description of the Related Art

The cathodic electrocoating process described above is known (cf., for example, German Offenlegungsschrift 3,518,732, German Offenlegungsschrift 3,518,770, EP-A 4,090, EP-A 12,463 and EP-A 262,069) and is employed, in particular, for priming automobile bodies.

SUMMARY OF THE INVENTION

The cathodic electrocoating process makes it possible—particularly when electrodeposition paints containing cationic, amino-modified epoxy resins as the binder are used—to obtain paint coatings of excellent quality.

In order to increase the anti-corrosion action, the electrodeposition paints in question contain lead pigments and also, if appropriate, in exceptional cases, chromate-containing pigments. These pigments are not harmless from the point of view of health and ecology.

The object on which the present invention is based consists in providing a process according to the pre-defining clause of patent claim 1 by means of which paint coatings can be obtained which offer good protection against corrosion even without, or with a reduced use of, lead pigments and/or chromate-containing pigments.

Surprisingly, this object is achieved by a process according to the pre-defining clause of patent claim 1 in which the aqueous electrodeposition paint contains 1 to 15 percent by weight of electrically conductive carbon black and/or graphite having a primary particle diameter of less than 10 μm in combination with up to 12 percent by weight of zinc powder or zinc flakes, with the percentages by weight relating to the total amount of binder and—if present—crosslinking agent contained in the electrodeposition paint.

Surprisingly, the paint coatings produced by the process according to the invention are of equal quality with the paint coatings produced by means of electrodeposition paints containing lead and/or chromate. In addition, the electrodeposition paints employed in accordance with the invention are, surprisingly, stable within a pH range from 6 to 8.

An anti-corrosion priming for protecting iron and steel components against corrosion is disclosed in German Offenlegungsschrift 2,101,577. This anti-corrosion priming contains an organic and/or inorganic binder, zinc, paint auxiliaries and solvents or diluents and carbon pigments, such as graphite and/or carbon black pigments. Experts confronted with the object of the present invention would not derive advice from the teaching of German Offenlegungsschrift 2,101,577, because no reference at all is made to electrodeposition paints in German Offenlegungsschrift 2,101,577. In addition, the degree of pigmentation of the primings disclosed in German Offenlegungsschrift 2,101,577 is stated to correspond, in respect of zinc, to the critical pigment-volume concentration. Electrodeposition paints having such a high content of zinc are unstable and afford paint films which have completely unsatisfactory mechanical properties.

DESCRIPTION OF THE PREFERRED EMBODIMENTS

In addition to carbon black and zinc, the electrodeposition paints employed in accordance with the invention usually contain at least one cathodically depositable synthetic resin and also at least one crosslinking agent, pigments, fillers, pasting resin and other additives generally well known, such as anti-foaming agents, leveling agents and the like.

In principle, the electrodeposition paints employed in accordance with the invention can contain any extraneously crosslinking or self-crosslinking, cathodically depositable synthetic resins which are suitable for the preparation of electrodeposition paints. The electrodeposition paints employed in accordance with the invention can also contain mixtures of different cathodically depositable synthetic resins. However, electrodeposition paints containing cationic, amine-modified epoxy resins as the cathodically depositable synthetic resins are preferred. Both self-crosslinking and extraneously crosslinking cationic, amine-modified epoxy resins are known. It is preferable to employ extraneously crosslinking, cationic, amine-modified epoxy resins.

Cationic, amine-modified epoxy resins are to be understood as meaning cationic reaction products formed from
  a) optionally modified polyepoxides and
  b) amines.

Polyepoxides are to be understood as meaning compounds containing two or more epoxide groups in the molecule.

Particularly preferred (a) components are compounds which can be prepared by reacting
  (i) a diepoxide compound or a mixture of diepoxide compounds having an epoxy equivalent weight of less than 2,000 with
  (ii) a compound which contains a phenol or thiol group and which reacts monofunctionally with epoxide groups under the given reaction conditions or a mixture of such compounds, the components (i) and (ii) being employed in a molar ratio of 10:1 to 1:1, preferably 4:1 to 1.5:1, and the reaction of the component (i) with the component (ii) being carried out at 100° to 190° C., if appropriate in the presence of a catalyst (cf. German Offenlegungsschrift 3,518,770).

Other particularly preferred (a) components are compounds which can be prepared by a polyaddition which is carried out at 100° to 195° C. in the presence of a catalyst if appropriate and which is initiated by a monofunctionally reacting initiator carrying either an alcoholic OH group, a phenolic OH group or an SH group, of a diepoxide compound and/or of a mixture of diepoxide compounds, if appropriate together with at least one monoepoxide compound, to give an epoxy resin in which the diepoxide compound and the initiator are incorporated in a molar ratio greater than 2:1 to 10:1 (cf. German Offenlegungsschrift 3,518,732).

Polyepoxides which can be employed for the preparation of the particularly preferred (a) components and can also themselves by employed as (a) components are polyglycidyl ethers of polyphenols prepared from polyphenols and epihalohydrins. Examples of polyphenols which can very particularly be employed are preferably bisphenol A and bisphenol F. In addition, 4,4'-dihydroxybenzophenone, bis-4(-hydroxyphenyl)-1,1-ethane, bis-4(-hydroxyphenyl)-1,1-isobutane, bis-(4-hydroxytertiarybutylphenyl)-2,2-propane, bis-(2-hydroxynaphthyl)-methane, 1,5-dihydroxynaphthalene and phenolic novolak resins are suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)2,2propane. It is also possible to employ polyglycidyl esters of polycarboxylic acids, such as, for example, oxalic acid, succinic acid, glutaric acid, terephthalic acid, 2,6-naphthalenedicarboxylic acid and dimerized linoleic acid. Typical examples are glycidyl adipate and glycidyl phthalate.

Hydantoin epoxides, epoxidized polybutadiene and polyepoxide compounds obtained by epoxidizing an olefinically unsaturated aliphatic compound are also suitable.

Modified polyepoxides are to be understood as meaning polyepoxides in which some of the reactive groups have been reacted with a modifying compound.

The following are mentioned as examples of modifying compounds:

(a) Compounds containing carboxyl groups, such as saturated or unsaturated monocarboxylic acids (for example benzoic acid, linseed oil fatty acid, 2-ethylhexanoic acid and versatic acid), aliphatic, cycloaliphatic and/or aromatic dicarboxylic acids of variable chain length (for example adipic acid, sebacic acid, isophthalic acid or dimeric fatty acids), hydroxyalkyl carboxylic acids (for example lactic acid or dimethylolpropionic acid) and also polyesters containing carboxyl groups or (b) compounds containing amino groups, such as diethylamine or ethylhexylamine, or diamines having secondary amino groups, for example N,N'-dialkylalkylenediamines, such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethylpolyoxypropylenediamine, polyaminoamides, such as, for example, versamides, in particular reaction products formed from diamines (for example hexamethylenediamine) and containing terminal amino groups, polycarboxylic acids, in particular dimeric fatty acids, and monocarboxylic acids, in particular fatty acids, or the reaction product of one mole of diaminohexane with two moles of monoglycidyl ether or monoglycidyl ester, in particular glycidyl esters of α-branched fatty acids, such as versatic acid, or (c) compounds containing hydroxyl groups, such as neopentylglycol, bis-ethoxylated neopentylglycol, neopentylglycol hydroxypivalate, dimethylhydantoin-N,N'diethanol, 1,6-hexanediol, 2,5-hexanediol, 1,4-bis(hydroxymethyl)cyclohexane, 1,1-isopropylidene-bis-(p-phenoxy)-2-propanol, trimethylolpropane or pentaerythritol, or amino alcohols, such as triethanolamine or methyldiethanolamine, or alkyl kerimines containing hydroxyl groups, such as aminomethyl-1,3-propanediol methyl isobutyl ketimine or tris-(hydroxymethyl)-aminomethane cyclohexanone ketimine, and also polyglycol ethers, polyester-polyols, polyether-polyols, polycaprolactone-polyols or polycaprolactampolyols of varying functionality and molecular weights or (d) saturated or unsaturated methyl esters of fatty acids which are transesterified in the presence of sodium methylate with hydroxyl groups of the epoxy resins.

Primary and/or secondary amines can be employed as component (b).

The amine should preferably be a water-soluble compound. Examples of such amines are monoalkylamines and dialkylamines, such as methylamine, ethylamine, propylamine, butylamine, dimethylamine, diethyiamine, dipropylamine, methylbutylamine and the like. Alkanolamines, such as, for example, methylethanolamine, diethanolamine and the like, are likewise suitable. Dialkylaminoalkylamines, such as, for example, dimethylaminoethylamine, diethylaminopropylamine, dimethylaminopropylamine and the like, are also suitable. In most cases low-molecular weight amines are employed, but it is also possible to use monoamines of fairly high molecular weight. The amines can also contain other groups, but these should not interfere with the reaction of the amine with the epoxide group, nor should they result in gelling of the reaction mixture.

It is preferable to employ secondary amines as (b) components.

The charges required for dilutability with water and electrical deposition can be produced by protonation with water-soluble acids (for example boric acid, formic acid, lactic acid or, preferably, acetic acid).

A further possible means of introducing cationic groups into the component (a) consists in reacting epoxide groups of the component (a) with amine salts.

The cationic, amine-modified epoxy resins can be employed either as extraneously crosslinking synthetic resins or as self-crosslinking synthetic resins. Self-crosslinking, cationic, amine-modified epoxy resins can be obtained, for example, by chemical modification of the cationic, amine-modified epoxy resins. A self-crosslinking system can be obtained, for example, by reacting the cationic, amine-modified epoxy resin with a partially masked polyisocyanate which contains, on average, one free isocyanate group per molecule and in which the masked isocyanate groups are unmasked only at elevated temperatures.

Preferred electrodeposition paints are obtained if extraneously crosslinking, cationic, amine-modified epoxy resins in combination with a suitable crosslinking agent are employed as cathodically depositable synthetic resins.

Examples of suitable crosslinking agents are phenoplasts, polyfunctional Mannich bases, melamine resins, benzoguanamine resins, masked polyisocyanates and compounds containing at least two groupings of the general formula $R^1$—O—CO—.

The radical $R^1$ has the following meanings:
$R^1 = R^2O$—CO—$CH_2$—, $R^3$—CHOH—$CH_2$—$R^4$—CHOR$^5$CHOH—$CH_2$—
$R^2$ = alkyl
$R^3$ = H, alkyl, $R^6O$—$CH_2$ or $R^6$—CO—O—$CH_2$—
$R^4$ = H or alkyl
$R^5$ = H, alkyl or aryl
$R^6$ = alkyl, cycloalkyl or aryl Preferred electrodeposition paints are obtained if masked polyisocyanates are employed as crosslinking agents.

It is possible to use, as masked polyisocyanates, any desired polyisocyanates in which the isocyanate groups have been reacted with a compound so that the masked polyisocyanate formed is resistant towards hydroxyl and amino groups at room temperature, but reacts at elevated temperatures, as a rule within the range from about 90° C. to about 300° C. In preparing the masked polyisocyanates, it is possible to use any desired organic polyisocyanates which are suitable for the crosslinking. Isocyanates containing about 3 to 36, especially about 8 to 15, carbon atoms are preferred. Examples of suitable diisocyanates are hexamethylene diisocyanate, 2,4-toluylene diisocyanate, 2,6-toluylene diisocyanate and 1-isocyanatomethyl-5-isocyanato-1,3,3-trimethylcyclohexane. It is also possible to use polyisocyanates of higher isocyanate functionality. Examples of these are trimerized hexamethylene diisocyanate and trimerized isophorone diisocyanate. It is also possible to use mixtures of polyisocyanates. The organic polyisocyanates suitable for use as crosslinking agents in the invention can also be prepolymers derived, for example, from a polyol, including a polyether-polyol or a polester-polyol.

Any desired suitable aliphatic, cycloaliphatic or aromatic alkyl monoalcohols can be used for masking the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols, such as cyclopentanol and cyclohexanol; and aromatic alkyl alcohols, such as phenylcarbinol and methylphenylcarbinol.

Other suitable masking agents are hydroxylamines, such as ethanolamine, oximes, such as methyl ethyl ketone oxime, acetone oxime and cyclohexanone oxime, or amines, such as dibutylamine and diisopropylamine. The polyisocyanates and masking agents mentioned can also be used in suitable ratios of amounts for the preparation of the partially masked polyisocyanates mentioned above.

The crosslinking agent is employed, as a rule, in an amount of 5 to 60% by weight, preferably 20 to 40% by weight, relative to the cationic, amine-modified epoxy resin.

It is fundamental to the invention that an electrodeposition paint containing 1 to 15 percent by weight of electrically conductive carbon black and/or graphite having a primary particle diameter of less than 10 $\mu$m in combination with up to 12 percent by weight of zinc powder or zinc flakes is employed in the process in question, with the percentages by weight relating to the total amount of binder and—if present—crosslinking agent contained in the electrodeposition paint.

The electrically conductive carbon blacks employed are carbon blacks having a specific surface area of up to 1,000 $m^2/g$ (BET/$N_2$ test method ASTM D 3027-78) and a pore volume of up to 400 ml/100 g (DBP adsorption test method ASTM D 2414-79). It is preferable to employ carbon blacks having a BET surface area of approx. 150 $m^2/g$ and a DBP adsorption of approx. 115 ml/100 g.

The carbon black or graphite content of the electrodeposition paints employed in accordance with the invention is 1 to 15 percent by weight, preferably 2 to 10 percent by weight and particularly preferably 4 to 9 percent by weight, with the percentages by weight relating to the total amount of binder and—if present—crosslinking agent contained in the electrodeposition paint.

The primaryparticle diameter of the carbon black employed should preferably be less than 0.1 $\mu$m.

If graphite is used, it should be graphite having a C content of over 95% by weight, preferably over 98% by weight.

The zinc employed in combination with the carbon black can be employed in the form of zinc powder or zinc flakes. It is preferable to employ zinc powder. Although not absolutely necessary, it can in some cases be appropriate to employ zinc treated with corrosion inhibitors.

The zinc content of the electrodeposition paints employed in accordance with the invention is up to 12, preferably 0.2 to 5, percent by weight, with the percentages by weight relating to the total amount of binder and—if present—crosslinking agent contained in the electrodeposition paint.

The incorporation of the carbon black or graphite and zinc into the electrodeposition paints is carried out in accordance with generally well known methods. The carbon black or graphite and the zinc are preferably incorporated in the form of a pigment paste into an aqueous dispersion of the cathodically depositable resin and—if present—crosslinking agent.

The preparation of pigment pastes is generally known and does not need to be described here in detail (cf. D. H. Parker, Principles of Surface Coating Technology, Intercience Publishers, New York (1965); R. L. Yates, Electropainting, Robert Draper Ltd., Teddington/England (1966); H:F. Payne, Organix Coating Technology, volume 2, Wiley and Sons, New York (1961)).

In addition to the carbon black or graphite and zinc, the pigment pastes can contain, in principle, any pigments suitable for electrodeposition paints. In general, titanium dioxide is the only or the principal white pigment. Other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate can, however, also be used. Examples of colored pigments which can be used are cadmium yellow, cadmium red, carbon black, phthalocyanine blue, chrome yellow, toluidiyl red and hydrated iron oxide.

In addition to the pigments, the pigment paste can also contain plasticizers, fillers, wetting agents and the like.

The pigment paste is added to the aqueous dispersion of the cathodically depositable synthetic resin in an amount such that the finished electrodeposition paint has the properties required for deposition. In most cases the weight ratio between the pigment and the cathodically depositable synthetic resin is 0.05 to 0.5.

The synthesis of the cathodically depositable synthetic resins is carried out by well known methods (cf., for example, German Offenlegungsschrift 3,518,732, German Offenlegungsschrift 3,518,770, EP-A 4,090 and EP-A 12,463) in organic solvents. The solutions or dispersions of synthetic resin thus obtained are neutralized and converted into an aqueous phase.

In addition to the cathodically depositable synthetic resin and the pigment paste, the electrodeposition paints employed in accordance with the invention can also contain other customary additives, such as, for example, additional solvents, antioxidants, surface-active agents and the like.

The solids content of the electrodeposition paints employed in accordance with the invention is preferably 7 to 35 parts by weight, particularly preferably 12 to 25 parts by weight. The pH of the electrodeposition paints is between 6 and 8, preferably between 6.5 and 7.5.

The electrodeposition paint is brought into contact with an electrically conductive anode and with the electrically conductive substrate connected as cathode. When an electric current is passed between anode and cathode, a firmly adhering paint film is deposited on the cathode.

The voltage applied can vary within a wide range and can be, for example, between two and one thousand volts. Typically, however, voltages between 50 and 500 volts are used. The current density is, as a rule, between about 10 and 100 amperes/m$^2$. The current density tends to decrease in the course of the deposition.

After the deposition, the coated article is rinsed and is ready for baking.

The deposited paint films are generally baked at temperatures of 130° to 200° C. for a period of 10 to 60 minutes, preferably at 150° to 180° C. for a period of 15 to 30 minutes.

The process according to the invention can be employed for coating any desired electrically conductive substrates, but particularly for coating metals, such as steel, aluminum, copper and the like.

The invention will be illustrated in greater detail in the following examples. Unless anything to the contrary is expressly stated, all data relating to parts and percentages are data by weight.

1. Preparation of aqueous synthetic resin dispersions based on cationic, amine-modified epoxy resins 1.1 Preparation of a dispersion according to Example B of EP-A 70,550

|  | Weight taken (g) |
| --- | --- |
| Epikote 829[1] | 727.6 |
| Capa 200[2] | 268.4 |
| Xylene | 36.1 |
| Bisphenol A | 197.8 |
| Dimethylbenzylamine | 3.8 |
| Isocyanate crosslinking agent[3] | 901.3 |
| Diketimine formed from MIBK and a 75% strength solution of diethylenetriamine in MIBK | 73.4 |
| N-methylethanolamine | 59.1 |
| Hexylglycol | 76.5 |
| Acetic acid | 33.5 |
| Emulsifier mixture[4] | 29.4 |
| Demineralized water | 1,793.1 |

[1] Epoxy resin from Shell Chemie, epoxide equivalent 188
[2] Polyester-diol from Interox Chemical
[3] Isocyanate crosslinking agent based on toluylene diisocyanate, masked with butylglycol and reacted with trimethylolpropane in a ratio of 3:1, incipiently dissolved in a mixture of MIBK and n-butanol (9:1) to give a solids content of 70%.
[4] Emulsifier mixture based on Geigy Amin C (Geigy Industrial Chemicals) 120 parts, Surfynol 104 (Air Products and Chemicals) 120 parts, butylglycol 120 parts and 221 parts of demineralized water containing 19 parts of glacial acetic acid.
MIBK = methyl isobutyl ketone Instructions for preparation The Epikote 829, Capa 200 and xylene are initially placed in a reaction vessel and are heated to 210° C. under N$_2$ protective gas. Water is then removed from the system for half an hour. The mixture is then cooled to 150° C. and bisphenol A and 1.6 parts of dimethylbenzylamine are added. The mixture is then heated to 180° C. and kept at this temperature for half an hour. It is then cooled to 130° C. and the remaining amount of dimethylbenzylamine is added. The temperature is then maintained for 2½ hours, the isocyanate crosslinking agent, the diketimine and N-methylethanolamine are then added and the temperature is then kept at 110° C. for half an hour. The hexylglycol is then added. The reaction mixture is then dispersed in the demineralized water which contains glacial acetic acid and emulsifier mixture. A vacuum is then applied in order to remove the volatile organic solvents. The solids content is adjusted to 36%.

Preparation of a zinc, carbon black and catalyst paste 2.1 Preparation of a pasting resin 800 parts of butylglycol are added to 953 parts of a commercial epoxy resin based on bisphenol A having an epoxide equivalent weight of 890. The mixture is heated to 80° C. 221 parts of a reaction product formed from 101 parts of diethanolamine and 120 parts of 80% strength aqueous lactic acid are then added to the resin solution. The reaction is carried out at 80° C. until the acid number has fallen below 1.

2.2 Preparation of a zinc paste 2,000 parts of the pasting resin are diluted with 400 parts of butylglycol. 1,000 parts of zinc powder (Zincoli Superfine 620 W ®) are added to this solution. The mixture is then thoroughly stirred and dispersed in a sand mill to a Hegman fineness of ≦10 μm.

2.3 Preparation of a carbon black paste 1,800 parts of the pasting resin are diluted with 300 parts of butylglycol and 2,800 parts of distilled water. 1,100 parts of carbon black (CORAX L ®, Degussa) are added slowly. After thorough mixing, the mixture is dispersed in a sand mill to a Hegman fineness of less than 10 μm.

2.4 Preparation of a catalyst paste 23.4 parts of pasting resin, 32.9 parts of dibutyltin oxide and 43.7 parts of demineralized water are thoroughly mixed and dispersed in a suitable sand mill to a particle size of less than 7 μm.

3. Preparation of electrodeposition paint baths and deposits according to the invention Electrodeposition paint baths are made up by weight from the dispersion according to 1.1, the zinc paste according to 2.2, the carbon black paste according to 2.3, and, if appropriate, additional pasting resin according to 2.1, in such a way that they always contain 15.1 percent by weight of organic solids (binder plus isocyanate crosslinking agent plus pasting resin). The ratio of pasting resin to binder plus isocyanate crosslinking agent is always 1:2.1.

In addition, all the baths contain 0.2% by weight of dibutyltin oxide in every case. It is added in the form of the catalyst paste. The resulting baths thus have a solids content of 15.3 percent by weight. Four different electrodeposition paint baths are prepared, having the following carbon black and zinc contents.

| Bath no. 1 | 9.8% by weight of carbon black (no zinc) |
|---|---|
| Bath no. 2 | 9.8% by weight of carbon black and 9.8% by weight of zinc |
| Bath no. 3 | 4.8% by weight of carbon black and 2.9% by weight of zinc |
| Bath no. 4 | 4.9% by weight of carbon black and 12.0% by weight of zinc |

The above percentages by weight relate to the solids content of 15.3% by weight, which is taken as 100%. In order to make it possible to maintain the abovementioned ratio of pasting resin to binder plus isocyanate crosslinking agent, it is necessary in some cases to add an appropriate amount of pasting resin.

The deposition of the paint films is effected on St 1405 steel sheets at 27° C. and a deposition voltage of 250 volts in the course of 2 minutes. The sheets are then dried at room temperature and baked at 180° C. for 20 minutes. The film thicknesses should be about 20 μm. In some cases it can be necessary to add solvents, such as, for example, butylglycol and phenoxypropanol, to the baths in order to obtain the desired film thickness.

The paint films obtained with baths 1, 2 and 3 are subjected to a salt spray test as specified in DIN 50,021 for a period of 360 hours. The results are evaluated as specified in DIN 53,167. The paint films obtained with bath 1 show a sub-migration of $W_d = 5.2$ mm. The paint films obtained with baths 2 and 3, on the other hand, only show a submigration of $W_d = 1.2$ mm and $W_d = 1.9$ mm, respectively, and thus display a significantly higher resistance to corrosion than the paint films obtained with bath 1. Typical electrodeposition paint baths containing lead pigments give films having $W_d$ values of 1.2 to 2 mm.

The films obtained with bath 3 are subjected to a reverse impact test as specified in ASTM D 2794/69 and to bending on a conical mandrel as specified in ISO 6860. Results: 10 inch-pound and 0 cm. Typical electrodeposition paint baths containing lead pigments give films having reverse impact values of 4 to 10 inch-pound and mandrel bend values of 0 to 1 cm.

The bath stability of bath no. 4 is investigated. No sediment has formed after 44 days. Only 2.5 percent by weight of the zinc employed have dissolved in the aqueous phase.

We claim:

1. A process for coating electrically conductive substrates, comprising the steps of
   A. immersing an electrically conductive substrate in an aqueous electrodeposition paint,
   B. connecting the substrate as a cathode,
   C. depositing a film on the substrate by direct current,
   D. removing the coated substrate from the electrodeposition paint, and
   E. baking the deposited paint film,
wherein the aqueous electrodeposition paint includes a binder, 1 to 15 percent by weight of an electrically conductive material selected from the group consisting of carbon black, graphite and mixtures thereof, having a primary particle diameter of less than 10 μm, and zinc, with the proviso that zinc is present in an amount not greater than 12 percent by weight, wherein the zinc is in a form selected from the group consisting of zinc powder and zinc flakes, with the percentages by weight relating to the total amount of the binder contained in the electrodeposition paint.

2. A process according to claim 1 wherein the binder is a cationic, amine-modified epoxy resin.

3. The process according to claim 1, wherein the electrodeposition paint further comprises a masked polyisocyanate crosslinking agent, and wherein the percent by weight of electrically conductive material and zinc, are based on the total weight of binder and crosslinking agent.

4. An aqueous, cathodically-depositable electrodeposition paint including a binder, 1 to 15 percent by weight of an electrically conductive material selected from the group consisting of carbon black, graphite and mixtures thereof having a primary particle diameter of less than 10 μm, and zinc, with the proviso that zinc is present in an amount not greater than 12 percent by weight, wherein the zinc is in a form selected from the group consisting of zinc powder and zinc flakes, with the percentages by weight relating to the total amount of the binder contained in the electrodeposition paint.

5. An electrodeposition paint according to claim 4 wherein the binder is a cationic, amine-modified epoxy resin.

6. The electrodeposition paint according to claim 4, further comprising a masked polyisocyanate crosslinking agent, wherein the percent by weight of electrically conductive material and zinc, are based on the total weight of binder and crosslinker.

* * * * *